Nov. 28, 1939.  H. E. SCHULSE  2,181,710
BREW COOLING
Original Filed Sept. 9, 1933
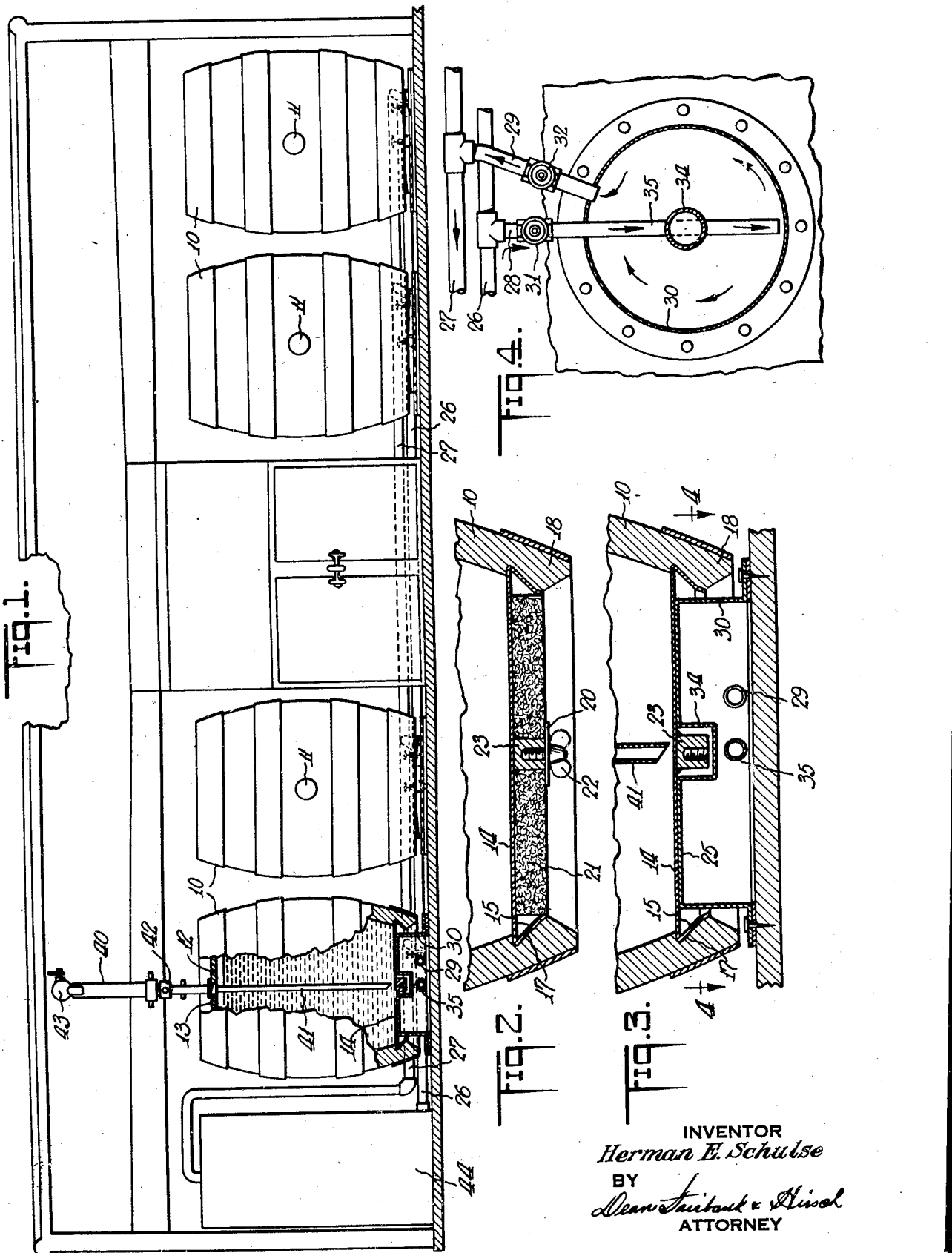
INVENTOR
*Herman E. Schulse*
BY
*Dean Fairbank & Hirsch*
ATTORNEY Patented Nov. 28, 1939

2,181,710

UNITED STATES PATENT OFFICE 2,181,710

BREW COOLING

Herman E. Schulse, Miami, Fla.

Original application September 9, 1933, Serial No. 688,779. Divided and this application October 9, 1937, Serial No. 168,265

13 Claims. (Cl. 62—141)

My present invention is concerned with shipping, cooling and dispensing beverages, to maintain them in most sanitary and palatable condition.

The invention has its preferred applicability in the handling of brew such as beer, although it is by no means limited thereto, and is more especially concerned with installations from which such beverages are drawn for sale in restaurants and at bars.

For a clear understanding of the purpose of the invention, it is noted that with the dispensing barrels heretofore commonly in use, when the brew is first drawn from the barrel or keg through a cooling unit, difficulty is encountered due to introduction into the brew of harmful organisms from the scale, mold and slime which form in the course of use in cooling coils, float valves, pressure valves and other control or cooling devices. Not only is the beverage being tapped rendered sour and unpalatable in such installations, but in many cases, the contents of the barrel are spoiled by return thereto of brew from the slime laden cooling unit. Where no such return flow occurs, there is also the waste of spoiled beer which has lodged in the refrigerating unit overnight, and which must be discarded to avoid rendering the beer unsanitary, and unpalatable.

Frequent removal of such accumulations of scale, mold and slime from the refrigerating unit is an arduous task, commonly neglected, and is, in most cases, unfeasible during the hours that the brew is being dispensed for sale.

Aside from these objections, excessive chilling of beer with the use of refrigerating coils to below the desired temperature generally approved by skilled brewers, results in impaired head, impaired flavor and cloudiness.

In the usual small beer dispensing establishments, cold storage facilities are not available for maintaining several barrels of beer continuously at the preferred temperature, and the difficulty therefore, sometimes results in loss of flavor, due to objectionable fermentation which may occur when the beer is allowed to reach a temperature much above 50 degrees F.

It is among the objects of the invention to maintain, by the simplest means, the beer within the barrel in proper condition as to temperature and purity, until it is dispensed directly therefrom, all with the total elimination of separate cooling tanks or receptacles with their coils, float valves and pressure and control valves, and thereby obviating all of the difficulties above noted encountered in the use of such instrumentalities.

Another object is to provide a beverage container which presents a rugged structure devoid of delicate parts, useful not only for shipping, but also for cooling and for permitting direct dispensing therefrom.

Another object is to provide a barrel or keg of the above type which can be fabricated in quantity production with the use of parts, standard in beer barrel construction, either of metal or of wooden type; and in which the modifications necessary for the added utility can be readily introduced.

Another object is to provide a barrel or keg construction of the above type, of standard dimensions, and which has the standard volumetric capacity, despite the presence of the cooling instrumentalities associated therewith, and which lends itself readily to handling in the brewery without the slightest alteration in brewers' equipment for barrel handling, washing, filling and the like.

Another object is to provide a shipping and cooling barrel or keg of the above type which may be caused to maintain its contents substantially without variation, at the proper temperature at all times, by the use of the comparatively simple cooling equipment, operable with a minimum of power expense, and devoid of delicate parts apt to become deranged.

The present application is a division of my copending application, Ser. No. 688,779, filed September 9, 1933, and patented on November 2, 1937, under No. 2,098,210.

In the accompanying drawing in which is shown one of various possible embodiments of the several features of the invention—

Fig. 1 is an elevation partly in section of an installation of a number of kegs embodying the present invention.

Fig. 2 is a fragmentary sectional view on a larger scale of the barrel or keg embodying my invention.

Fig. 3 is a fragmentary sectional view showing the keg of Fig. 2 mounted for cooling, and, Fig. 4 is a view in transverse cross section on line 4—4 of Fig. 3.

Referring now to Figs. 1 and 2, there is shown a beer barrel or keg having the usual wooden heat insulating side wall 10 provided with the conventional removable bung 11 for filling and cleaning purposes and an upper wooden wall or draft head 12 provided with the usual draft outlet 13 adapted to be closed by conventional means for the purpose.

The keg structure, which is thus far described is conventional, is modified according to the present invention, by having its lower head plate 14 of heat-conducting metal, and by providing thereon a peripheral downwardly inturned flange 15 of contour to fit snugly in a V-shaped croze 17 in the side wall 10 to form a chime 18. The inner face of the metal head plate 14 is in direct contact with the liquid contents of the barrel, and the outer or exposed face of said plate during shipment or storage is covered by a heat insulating disc or pad 21, lodged within the flange 15, and removably fixed to said plate by a holding disc 20 and a thumb screw 22, passing therethrough and threaded into a tapped socket or boss 23 welded to the under face of said plate.

The keg shown in Figs. 2 and 3 is employed in the system shown in Figs. 1 and 4, in which a feed pipe main 26, and a return main 27 for circulating a suitable cooling medium are disposed at the floor of the establishment, and have taps or branch connections 28 and 29, which lead to a hollow cooling platform, drum or chamber 30, having a top wall 25 of heat conducting material such as metal, and which are provided with valves 31 and 32 respectively. After the manual removal of the thumb screw 22 and the insulating pad 21, the keg is seated on and its lower end telescoped over the cooling platform 30. The metal head plate 14 will then rest flush upon the cooling platform 30, which is countersunk at 34 to accommodate the socket 23 on said plate 14. The lower ends of the barrel staves in that relation are preferably elevated slightly above the floor.

The branch 28 communicates with a pipe 35, extending diametrically of the cooling platform or drum 30, and emptying thereinto at the side remote from its inlet, while the return branch 29 is adjacent to inlet 28, thus assuring adequate circulation of the cooling medium through the hollow platform 30.

In operation, the cooling drum or platform 30 contacting with the metal heat conducting head plate 14, will abstract heat as desired from the lower end of the barrel or keg to cool the contents to the desired temperature at the region from which the beer is withdrawn for consumption.

In the installation shown in Fig. 1 illustratively, behind the dispensing bar or serving counter, kegs such as shown in Figs. 2 and 3 are disposed in side by side relation. One of the kegs is shown tapped by a draft tube 40 shown only diagrammatically and which is not claimed herein. The draft tube may comprise tube 41, extending through the outlet 13, and also a coupling 42 for applying the gas pressure to propel the beer through the tube 41 to a dispensing faucet 43, carried at the upper end thereof.

The two mains 26 and 27 are connected to a suitable refrigerating unit 44 at one end of the bar, and extend just above the floor in back of the kegs as shown in Fig. 1. This refrigerating unit 44 is thermostatically controlled in any suitable manner such as that shown in my parent application, Serial No. 688,779, to maintain a predetermined cooling temperature in the hollow platforms 30, and serves to circulate a cooling medium through the mains 26 and 27. Each hollow platform 30 is connected at all times to the cooling system, so that all kegs, both those on tap and those in reserve are being cooled, the cooling effect being applied through the bottom of the keg. The temperature of the contents is brought down most rapidly at the bottom from which region the draft tube draws, and the beer is not agitated or moved during such cooling.

In the continuous circulation, the temperature-regulated cooling medium from the main 26 will enter the hollow platform 30 through the connections 28 and 35, and thence will flow rapidly through the space determined by said platform, returning by pipe 29 to the return main 27. Throughout the circulation, the space determined by the platform 30 will remain at all times filled with the cooling medium from the circulating system.

Although the invention is shown as applies to a keg having a wooden side wall, as far as certain aspects of the invention are concerned, the invention can also be applied to steel kegs.

As many changes could be made in the above constructions, and many apparently widely different embodiments of this invention could be made without departing from the scope of the claims, it is intended that all matter contained in the above description or shown in the accompanying drawing shall be interpreted as illustrative and not in a limiting sense.

Having thus described my invention, what I claim as new and desire to secure by Letters Patent is:

1. A keg for shipping, cooling and dispensing beverages, said keg having a chime and a metal end wall secured therein, said end wall having removably affixed to the exterior surface thereof an insulating cover therefor, countersunk with respect to the rim of the keg structure.

2. A keg for shipping, cooling and dispensing beverages, said keg having a chime, a sheet metal end wall in the form of a circular tray having a rim lodged in the chime of the keg, said end wall having a heat insulating disk lodged snugly against the outer face thereof, and means for removably maintaining said insulating disk against said tray structure.

3. A keg for shipping, cooling, and dispensing brew or the like including a heat insulated side wall a metal end plate near one end of said side wall a heat insulating pad, and means for removably securing said pad in heat insulating position with respect to the outer face of said end plate.

4. A keg for shipping, cooling and dispensing beverages including a side wall, a metal end plate set into said side wall, and having a central boss extending outwardly from the outer face of said plate, a heat insulating pad lodged snugly against the outer face of said plate and encircling said boss, and clamping means secured to said boss for removably maintaining said insulating pad against said plate.

5. A keg for shipping, cooling and dispensing beverages including a side wall, a metal end plate set into said side wall and having a central boss extending outwardly from the outer face of said plate, a heat insulating pad lodged snugly against the outer face of said plate and encircling said boss, and a thumb screw threaded into said boss for removably maintaining said insulating pad against said plate.

6. In combination a barrel for shipping, cooling, and dispensing brew or the like including a heat insulating side wall, and a metal end plate at the bottom end having its inner face in direct contact with the liquid contents of said barrel, a cooling chamber in heat conductive contact with the outer face of said plate, and conduits extending from the side of said cooling chamber for circulating cooling medium therethrough.

7. In combination a cooling chamber affixed to a floor and having a top wall of heat conducting material, and a keg for dispensing brew or the like, having a side wall and a metal end plate near the bottom, and seated upon said cooling chamber in dispensing position with the outer face of said plate in heat conductive contact with the top wall of said chamber.

8. In combination a cooling chamber affixed to a floor and having a top wall of heat conducting material countersunk in the central portion thereof, and a beer keg having a metal end plate near the bottom thereof and seated on said cooling chamber in dispensing position, with the outer face of said plate in heat conductive contact with said top wall, said plate having a downwardly extending boss adapted to support means for clamping a heat insulating pad in contact with the outer face of said plate during the shipment or storage of said keg and extending into the countersunk portion of said top wall.

9. In combination a cooling chamber affixed to a floor, and having a top wall of heat conducting material, a beer keg having a metal end plate spaced a comparatively short distance from the lower end of the keg and affording a chime, said barrel being seated on, and telescoped over said cooling chamber with the outer face of said plate in heat conductive contact with said top wall, and means for circulating a cooling medium through said chamber.

10. In combination a feed pipe main and a return pipe main for circulating cooling medium, a cooling chamber affixed to a floor, and having a top wall of heat conducting material, branch connections between said mains and the interior of said chamber for effecting circulation of cooling medium therethrough, and a beer keg having a bottom head plate of metal and seated on said top wall in dispensing position, with the outer face of said plate in heat conductive contact with said top wall.

11. In combination a cooling chamber affixed to a floor and having a top wall of heat conducting material, a pipe having its open end adjacent the inner periphery of said chamber on one side thereof, another pipe extending diametrically of said chamber, and having its open end substantially diametrically disposed with respect to the open end of said first mentioned pipe, one of said pipe connections serving as an inlet for the delivery of cooling medium into said chamber, and the other serving as a return pipe for said cooling medium, and a beer keg seated upon said cooling chamber in dispensing position and having a metal end plate near the bottom thereof in direct heat conductive contact with said top wall.

12. A beer cooling and dispensing system including a bar, a plurality of hollow platforms arranged side by side along the floor, behind said bar, means for circulating a cooling medium through each of said platforms, and a plurality of beer kegs each having a metal bottom plate, the inner face of which is in direct contact with the liquid contents of the keg, each of said kegs being seated in dispensing position on a corresponding platform with the outer face of said plate in heat conductive contact with said platform, some of said kegs being on tap for dispensing purposes, while other kegs are being cooled and maintained at dispensing temperature and on reserve prior to tapping.

13. The combination set forth in claim 12 in which the cooling medium is introduced into said platform through a longer pipe, substantially diametrically thereacross, and is discharged from said platform through a shorter pipe adjacent the inlet end of said longer pipe.

HERMAN E. SCHULSE.